United States Patent
Onodera et al.

(10) Patent No.: US 7,659,937 B2
(45) Date of Patent: Feb. 9, 2010

(54) CAMERA MODULE EQUIPPED WITH AN OPTICAL FILTER HAVING AN EDGE NOT IN CONTACT WITH A FIXING PORTION

(75) Inventors: Masanori Onodera, Kawasaki (JP); Susumu Moriya, Kawasaki (JP); Izumi Kobayashi, Kawasaki (JP); Hiroshi Aoki, Kawasaki (JP); Koji Sawahata, Kawasaki (JP); Shigeo Iriguchi, Kawasaki (JP); Toshiyuki Honda, Kawasaki (JP); Katsuro Hiraiwa, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 350 days.

(21) Appl. No.: 11/391,706

(22) Filed: Mar. 29, 2006

(65) Prior Publication Data

US 2006/0243884 A1    Nov. 2, 2006

Related U.S. Application Data

(63) Continuation of application No. PCT/JP03/12537, filed on Sep. 30, 2003.

(51) Int. Cl.
*H04N 5/225* (2006.01)
(52) U.S. Cl. .................. 348/340; 348/360
(58) Field of Classification Search ........ 250/208.1; 348/374, 45, 340, 360
See application file for complete search history.

(56) References Cited

U.S. PATENT DOCUMENTS

| | | | |
|---|---|---|---|
| 5,834,778 A * | 11/1998 | Veyrier et al. | 250/352 |
| 5,949,655 A | 9/1999 | Glenn | |
| 6,144,031 A * | 11/2000 | Herring et al. | 250/352 |
| 7,190,404 B2 * | 3/2007 | Shinomiya | 348/374 |
| 7,456,901 B2 * | 11/2008 | Jeong et al. | 348/374 |
| 2001/0020738 A1 * | 9/2001 | Iizima et al. | 257/680 |

(Continued)

FOREIGN PATENT DOCUMENTS

CN    2378391 Y    5/2000

(Continued)

OTHER PUBLICATIONS

International Search Report of PCT/JP/03/12537 dated Feb. 3, 2004.

(Continued)

*Primary Examiner*—Tuan Ho
*Assistant Examiner*—Kent Wang
(74) *Attorney, Agent, or Firm*—Fujitsu Patent Center

(57) ABSTRACT

A camera module includes a module structure constituted by a lens unit to which an image pickup lens is attached and a package to which an imaging element is attached so as to be opposite to the image pickup lens. An optical filter is arranged between the imaging element and the image pickup lens. A portion of a flat surface of the optical filter is fixed to a filter fixing portion via an adhesive. The optical filter is adhered to the filter fixing portion in a state in which an end portion formed by a side surface of the optical filter and the flat surface is in noncontact with the filter fixing portion or the adhesive. Minute particles generated from a cut surface of the optical filter fall outside the filter fixing portion.

3 Claims, 14 Drawing Sheets

U.S. PATENT DOCUMENTS

2001/0050717 A1* 12/2001 Yamada et al. ............... 348/340
2002/0012062 A1   1/2002 Fushimi et al.
2002/0119658 A1   8/2002 Honda et al.

FOREIGN PATENT DOCUMENTS

| CN | 1373519 A    |   | 10/2002 |
|----|--------------|---|---------|
| EP | 1 289 281    |   | 3/2003  |
| JP | 58-53277     | * | 3/1983  |
| JP | 04-023469 A  |   | 1/1992  |
| JP | 6-7587 B2    |   | 1/1994  |
| JP | 2001-358997 A |  | 12/2001 |
| JP | 2002-252796 A |  | 9/2002  |
| JP | 2002-373977 A |  | 12/2002 |
| JP | 2003-189195 A |  | 7/2006  |

OTHER PUBLICATIONS

Japanese Office Action dated Aug. 5, 2008 (mailing date), issued in corresponding Japanese Patent Application No. 2007-208860.

Supplementary European Search Report (with Annex) and Lack of Unity sheets A-B, mailing date—Mar. 2, 2009 in corresponding EP application 03 74 8626; European Patent Office.

Chinese Office Action dated Sep. 19, 2008, issued in corresponding Chinese Patent Application No. 200710165575.9.

* cited by examiner

CAMERA MODULE EQUIPPED WITH AN OPTICAL FILTER HAVING AN EDGE NOT IN CONTACT WITH A FIXING PORTION

CROSS-REFERENCE TO RELATED APPLICATIONS

This application is a U.S. continuation application, filed under 35 USC 111(a) and claiming the benefit under 35 USC 120 and 365(c), of PCT application JP2003/012537 filed Sep. 30, 2003. The foregoing application is hereby incorporated herein by reference.

BACKGROUND OF THE INVENTION

1. Field of the Invention

The present invention relates to camera modules and, more specifically, to a camera module in which a light-receiving element and an image pickup lens are unified by packaging.

2. Description of Related Art

In recent years, a cameral module, in which an imaging element and an image pickup lens are incorporated by being integrated with each other, is used as a camera system containing a signal processing system in an application of mounting to a compact information terminal such as a personal computer or a portable television telephone.

For example, a portable telephone equipped with a small camera takes a picture of a speaker so as to take it in as image data, and transmits the image data to a telephoning party. Such a small camera generally comprises a CMOS (or CCD) sensor as an imaging element and an image pickup lens.

Miniaturization of portable telephones and personal computers is advanced further, and further miniaturization is required for a small camera, which is incorporated into such equipments. In order to satisfy such a demand for the small camera, a camera module, which is formed by incorporating an image pickup lens and a CMOS (CCD) sensor into a single package, has been developed.

In the module, an optical filter is arranged between the lens and the imaging element for the purpose of improving image quality (flare, ghost, moiré fringes). As such an optical filter, an optical low-pass filter (OLPF) of a crystal plate formed with an anti-reflection film or an infrared cut filter film or a glass plate applied with an infrared cut film is used widely.

The camera module generally comprises a lens holder for holding an image pickup lens and a package for holding an imaging element. Since the above-mentioned optical filter is arranged between the image pickup lens and the imaging element, there are a case in which the optical filter is attached on the lens holder side and a case in which the optical filter is attached on the package side.

The optical filter is formed so as to function as a desired optical filter by forming a film on a large substrate, and thereafter, cut out as individual filters of a predetermined size. At this time, minute unevenness of an order of several micrometers or several tens micrometers. Additionally, cutting-burrs may be formed or minute particles of a cover film may be adhered on the optical filter. The optical filter after cutting is cleaned by air blow or the like since an optical filter function may be deteriorated if it is washed by water or liquid.

However, according to air blow, extraneous matter cannot be removed completely. For this reason, in the process of incorporating an optical filter into a camera module, when vibration or shock is applied to the optical filter, the above-mentioned burr or extraneous matter (hereinafter, referred to as minute particles) may be separated from the optical filter and remain in the camera module. Additionally, when a vibration or shock is applied to the camera module during use or transportation of equipments using the camera module, the above-mentioned minute particles may be separated from the optical filter.

Since the optical filter is arranged above the imaging element, the minute particles separated from the optical filter may fall onto an imaging surface of the imaging element. In such a case, there is a problem in that quality of the image obtained by the camera module is deteriorated.

Additionally, as a structure of the camera module, for example, there is suggested a structure in which an imaging element is attached to one surface of a plastic molded part and a lens holder having an image pickup lens is attached to an opposite side surface of the plastic molded part. A through hole for passing a light from the lens toward the imaging element is provided in the plastic molded part. The imaging element is flip-chip mounted to a wiring pattern formed on the one surface of the plastic molded part. The imaging element detects a light incident on an element surface in which a light-receiving part or a micro lens is present, and performs a photoelectric conversion. The thus-obtained electric image signal is supplied to a signal processing circuit or the like, and an image is displayed on a screen of a display based on the processed image signal.

In the cameral module of the above-mentioned structure, it is necessary to make a thickness of the plastic molded part (that is, a distance between the image pickup lens and the imaging element) to be a predetermined dimension so as to acquire a focal distance of the image pickup lens, and, thus, there exists a wasted space in the plastic molded part. Accordingly, there is a demand for effective use by embedding a component part in the wasted space in the plastic molded part.

Thus, there is suggested a structure in which a signal processor having the above mentioned signal processing circuit or the like formed therein is embedded in the plastic molded part. However, when the camera module operates, an electromagnetic filed is generated from the processor element incorporated in the package of the cameral module. There may be a problem generated due to influences of such an electromagnetic field in that a noise is generated in the image signal output from the imaging element, thereby deteriorating the image.

It should be noted that there are the following patent documents as documents relevant to the present invention.

1. Japanese Laid-Open Patent Application No. 2003-189195

2. Japanese Patent Publication No. 6-7587

SUMMARY OF THE INVENTION

It is a general object of the present invention to provide an improved and useful camera module in which the above-mentioned problems are eliminated.

A more specific object of the present invention is to eliminate an influence to an image caused by foreign matters generated from a cut surface of an optical filter incorporated in a camera module so as to prevent deterioration of the image output from the camera module.

Another object of the present invention is to achieve a compact camera module by effectively using an internal space of a plastic molded part of a camera module.

A further object of the present invention is to reduce an influence of an electromagnetic filed generated from a processor element when the processor element is incorporated into a plastic molded part of a camera module.

In order to achieve the above-mentioned objects, there is provided according to one aspect of the present invention a camera module comprising: a module structure constituted by a lens unit to which an image pickup lens is attached and a package to which an imaging element is attached so as to be opposite to the image pickup lens; an optical filter arranged between the imaging element and the image pickup lens; and a filter fixing surface provided in the module structure so that a portion of a flat surface of the optical filter is fixed thereto via an adhesive, wherein the optical filter is adhered to the filter fixing surface in a state in which an end portion formed by a side surface of the optical filter and the flat surface is in noncontact with the filter fixing surface or the adhesive.

According to the above-mentioned invention, the end portion of the optical filter is bonded to the filter fixing surface in a noncontact state. That is, since the end portion of the optical filter is at a position displaced from the filter fixing surface, if minute particles are separated and fallen from the end portion of the optical filter, the particles fall outside the filter fixing surface. Thus, the minute particles are prevented from falling onto the imaging element.

In the above-mentioned camera module according to the present invention, a recessed portion is preferably formed along an outer circumference of the filter fixing surface, and an outer circumference of the optical filter preferably protrudes above the recessed portion.

Additionally, there is provided according to another aspect of the present invention a camera module comprising: a module structure constituted by a lens unit to which an image pickup lens is attached and a package to which an imaging element is attached so as to be opposite to the image pickup lens; an optical filter arranged between the imaging element and the image pickup lens; and a filter fixing portion provided in the module structure so that a portion of a flat surface of the optical filter is fixed thereto via an adhesive, wherein the filter fixing portion is an annular protruding portion formed to protrude from a periphery; and the optical filter is adhered to the filter fixing surface in a state in which a side surface of the optical filter protrudes outside from the annular protruding portion.

According to the above-mentioned invention, since the side surface of the optical filter protrudes outside from the protruding portion forming the filter fixing surface, if minute particles are separated and fallen from the end portion of the optical filter, the particles fall outside the protruding portion. Thus, the minute particles are prevented from falling onto the imaging element.

In the above-mentioned camera module according to the present invention, the outer circumference of the annular protruding portion preferably has a generally square shape having rounded four corners, and the optical filter is preferably adhered by the adhesive being applied to an entire top surface of the protruding portion.

Additionally, there is provided according to another aspect of the present invention a camera module comprising: a module structure constituted by a lens unit to which an image pickup lens is attached and a package to which an imaging element is attached so as to be opposite to the image pickup lens; and an optical filter arranged between the imaging element and the image pickup lens, wherein at least a portion of an outer circumferential portion including a side surface of the optical filter is covered by a metal film.

According to the above-mentioned invention, if minute particles are attached to the outer circumferential portion of the optical filter, the minute particles are fixed to the optical filter by the metal film. Accordingly, the minute particles are not separated from the optical filter even if a vibration or shock is applied to the optical filter, and, thus, the minute particles are prevented from falling onto the imaging element.

In the camera module according to the above-mentioned invention, the metal film is preferably a thin film formed by vapor deposition.

Additionally, there is provided according to another aspect of the present invention an optical filter configured to be arranged between an image pickup lens and an imaging element arranged to be opposite to the image pickup lens, wherein at least a portion of an outer circumferential portion including a side surface of the optical filter is covered by a resin.

According to the above-mentioned invention, if minute particles are attached to the outer circumferential portion of the optical filter, the minute particles are fixed to the optical filter by the resin. Accordingly, the minute particles are not separated from the optical filter even if a vibration or shock is applied to the optical filter, and, thus, the minute particles are prevented from falling onto the imaging element.

In the optical filter according to the above-mentioned invention, the optical filter preferably has a generally square shape, and the resin preferably covers four corners of the optical filter. Additionally, the resin is preferably a matte resin in black or gray. Further, the resin is preferably an elastic adhesive of a moisture curing type.

There is provided according to a further aspect of the present invention a camera module comprising; a plastic package having a through opening; an image pickup lens attached to one side of the plastic package; and an imaging element attached to the plastic package at a position opposite to the image pickup lens through the through opening, wherein a first semiconductor device controlling an operation of the imaging element, a circuit board formed on the first semiconductor device and a second semiconductor device and an electronic part mounted on the circuit board are incorporated into the plastic package.

According to the above-mentioned invention, since the second semiconductor device and the electronic part are arranged on the first semiconductor device so as to effectively use an internal space of the plastic packager more parts can be accommodated in the cameral module while miniaturizing the camera module.

In the camera module according to the above-mentioned invention, the second semiconductor device is preferably a semiconductor memory device used by the first semiconductor device when operating, and the electronic part is preferably related to operations of the first and second semiconductor devices. Since the camera module handles a large amount of image data by providing the semiconductor memory device such as a memory in the vicinity of the first semiconductor device, which is a processor for controlling image data, the image data processing can be efficiently and rapidly performed.

Additionally, in the camera module according to the above-mentioned invention, the circuit board preferably includes a metal solid layer having a substantially entire surface being a metal layer. By making the metal solid layer to be at a ground potential, an electromagnetic filed generated from the first semiconductor device can be shielded, which prevents a noise from entering the image signal due to the electromagnetic filed.

Additionally, the circuit board is preferably a rigid board selected from a group consisting of a glass-epoxy board, a ceramics board and a glass bard. The second semiconductor device and the electronic part may be electrically connected to the first semiconductor device through the circuit board. Additionally, the circuit board may be electrically connected to a pattern wiring formed on the first semiconductor device or the plastic package by bonding wires.

Additionally, there is provided according to another aspect of the present invention a camera module comprising: a plastic package having a through opening; an image pickup lens attached to one side of the plastic package; and an imaging element attached to the plastic package at a position opposite to the image pickup lens through the through opening, further comprising a first semiconductor device incorporated into the plastic package and controlling an operation of the imaging element; and a circuit board containing a metal solid layer of which substantially entire surface is a metal layer is formed on the first semiconductor device.

In the camera module according to the above-mentioned invention, at least one of a second semiconductor device and an electronic part may be mounted on the circuit board. Additionally, the circuit board is preferably a rigid board selected from a group consisting of a glass-epoxy board, a ceramics board and a glass bard. Further, the circuit board may be electrically connected to a pattern wiring formed on the first semiconductor device or the plastic package by bonding wires.

Other objects features and advantages of the present invention will become more apparent from the following detailed description when read in conjunction with the accompanying drawings.

DETAILED DESCRIPTION OF THE PREFERRED EMBODIMENTS

First, a description will be given, with reference to FIG. 1, of a first embodiment of the present invention.

Figure 1:
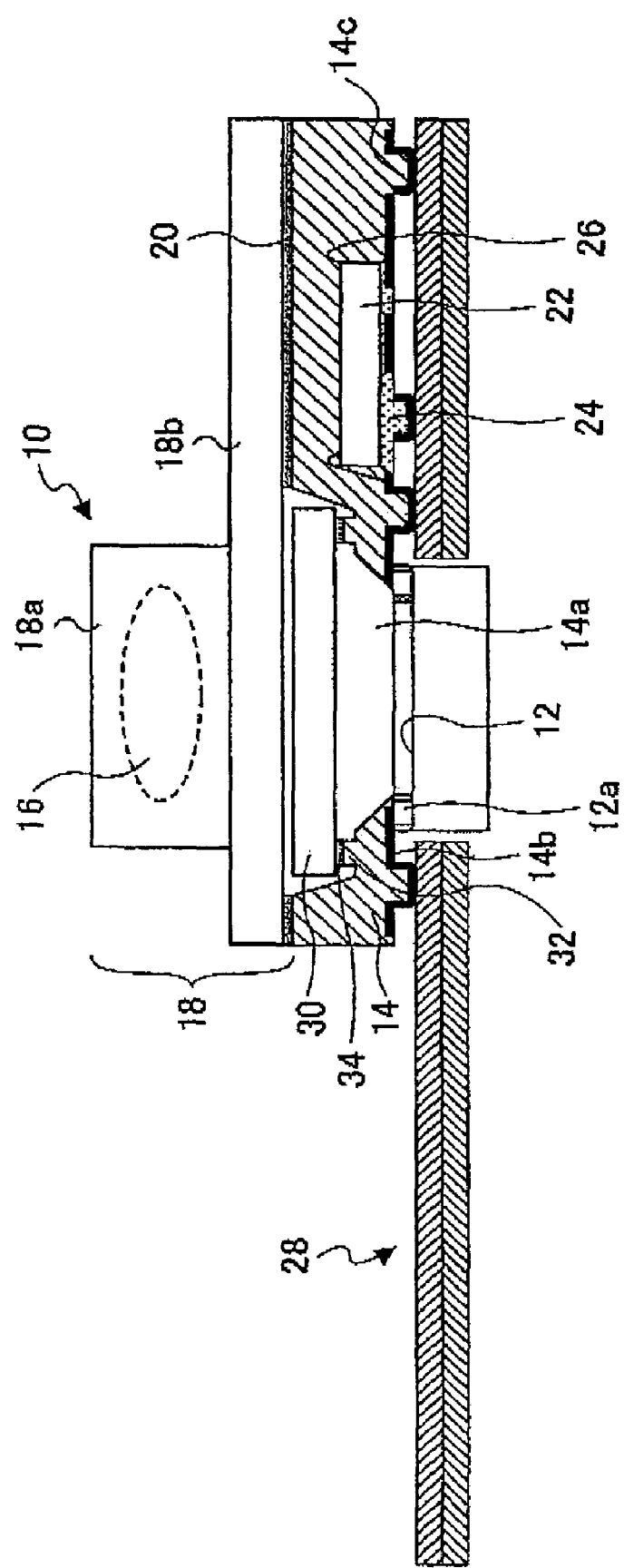
FIG. 1 is a cross-sectional view of a camera module according to a first embodiment of the present invention.

FIG. 1 is a cross-sectional view of a camera module according to the first embodiment of the present invention. The camera module shown in FIG. 1 comprises a package 14 having an imaging element 12 and a lens unit 18 having an image pickup lens 16 (hereinafter, simply referred to as lens). The package 14 and the lens unit 18 are formed by resin, and the lens unit 18 is fixed to the package 14 via an adhesive 20. It should be noted that, in FIG. 1, the lens unit 18 is not shown as a cross-section.

The lens unit 18 comprises a mirror-cylinder part 18a in which the lens 16 is accommodated and a base part 18b which is a portion fixed to the package 14. The mirror-cylinder part 18a is provided with a through opening (not shown) so that a light passed through the lens 16 passes through the through opening and travels toward the package 14. As the lens 16, a plastic lens is used generally.

The package 14 is provided with a through opening 14a as well in a portion opposite to the through hole of the mirror-cylinder part 18a of the lens unit 18. The imaging element 12 is mounted to a bottom surface 14b of the package 14, which is opposite to the lens unit of the package 14, in a state where it covers the through opening 14a. Specifically, protruding electrodes 12a of the imaging element 12 are flip-chip connected to a pattern wiring (terminals) formed on the bottom surface 14b of the package 14.

It should be noted that a module structure serving as a body of the camera module 10 is constituted by assembling the lens unit 18 to the package 14.

According to the above-mentioned structure, a light incident on the lens 16 passes the opening of the lens unit 18 and the through opening 14a of the package 14 and is incident on an imaging surface 12b of the imaging element 12 to form an image. An image signal (electric signal) corresponding to the image formed on the imaging surface 12b is output from the imaging element 12.

The image signal output from the imaging element 12 is processed by a drive element 22 incorporated in the plastic package 14. The drive element 22 serves as a processor for controlling an operation of the imaging element 12. A die attachment agent 24 is provided under the drive element 22, and electrodes of the drive element 22 are electrically connected to a plated wiring (pattern wiring) 26 formed on a bottom surface 14b of the package 14 by bonding wires inside the package 14. An output signal from the drive element 22 is supplied to an external device through a flexible board 28 to which the camera module 10 is connected.

The flexible board 28 is provided with an opening 28a at a position opposite to the imaging element 12, and the camera module 10 is connected to the flexible board 28 in a state where the imaging element 12 enters the opening 28a. Specifically, protruding electrodes 14c are formed on the bottom surface 14b of the package 14, and the protruding electrodes 14c are connected to a circuit pattern (terminals) of the flexible board 28. The protruding electrode 14c is so-called resin bump in which a metal film is formed on a protrusion of resin.

In the camera module 10 of the above-mentioned structure, an optical filter 30 (hereinafter, simply referred to as filter) is arranged between the lens 16 and imaging element 12. The filter 30 is provided for adjusting a light incident on the imaging element 12, and the imaging element 12 serves as, for example, a filter for removing an unnecessary infrared component.

The filter 30 is bonded by an adhesive 34 in a state where it is placed on a filter fixing portion 32 provided in the through opening 14a of the package 14. Although the filter 30 is attached to the filter fixing portion 32 in the example shown in FIG. 1, the filter 30 may be attached to the base part 18b of the lens unit 18. That is, the filter 30 is attached to the camera modular structure, which comprises the package 14 and the lens unit 18, so as to be arranged between the lens 16 and the imaging element 12.

Figure 2:
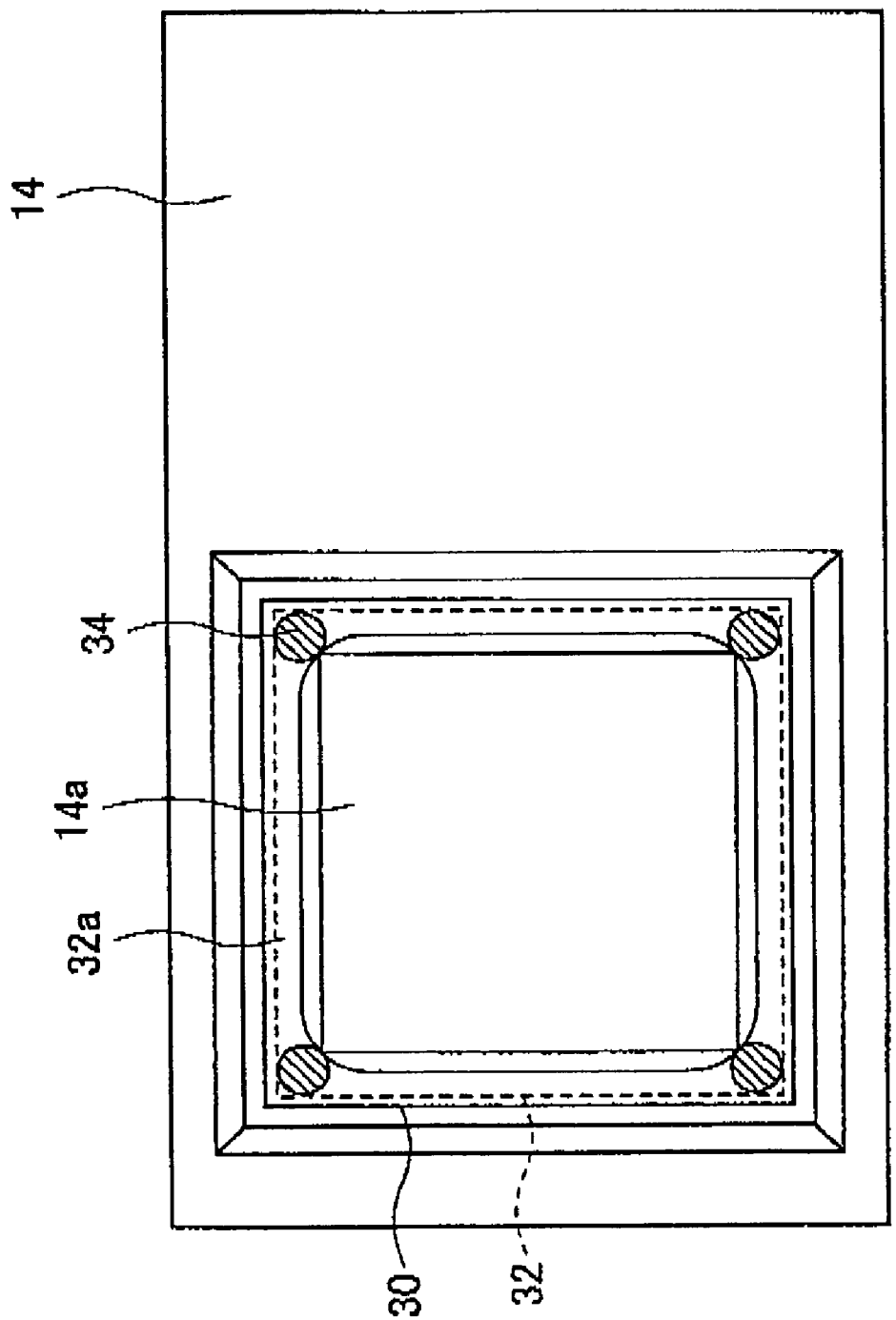
FIG. 2 is a plan view of a package shown in FIG. 1 viewed from a lens unit side.

FIG. 2 is a plan view of the package 14 shown in FIG. 1 viewed from the lens unit side. As shown in FIG. 2, the filter 30 is arranged so as to block the through opening 14a of the package 14.

The through opening 14a is an opening of a generally square shape, and the filter 30 is also formed in a generally square shape. A peripheral portion of the filter is adhered by an adhesive 34 to the filter fixing portion 32 formed in a generally square annular shape. In FIG. 2, an outer configuration of the filter fixing portion 32 is indicted by dotted lines. The adhesive 34 is provided on four corners of the generally square shaped filter 30 as indicated by oblique lines in FIG. 2. However, the adhesive 34 may be provided on an entire top surface 32a (filter fixing surface) of the filter fixing portion 32.

Figure 3:
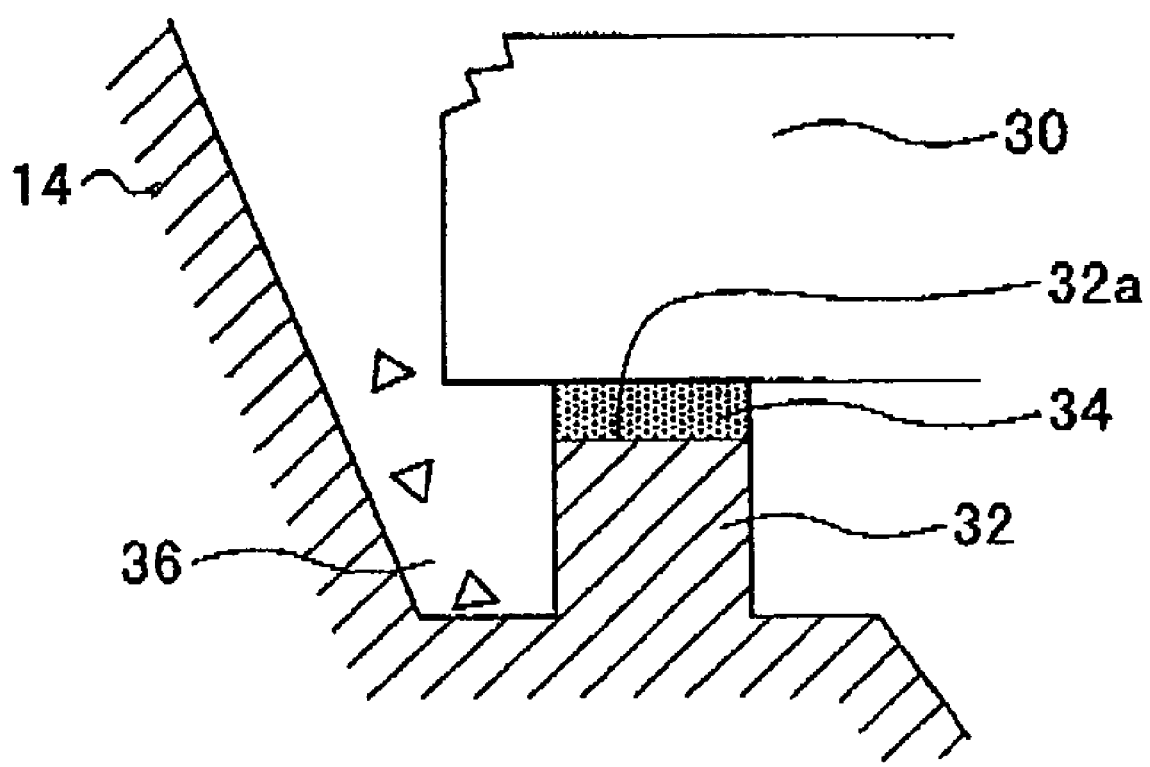
FIG. 3 is an enlarged cross-sectional view of a portion fixed to a filter fixing part with an adhesive.

FIG. 3 is an enlarged cross-sectional view of a portion where the filter 30 is fixed to the filter fixing portion 32 by the adhesive. The filter fixing portion 32 is an annular protruding portion protruding slightly from a peripheral portion, and the top surface 32a serves as the filter fixing surface.

As shown in FIG. 3, burrs and cutting chips adhering to a corner of the filter 30 becomes minute particles by being separated from the filter 30 when a shock or vibration is applied, and fall around the filter fixing portion 32. If such minute particles fall onto the imaging surface 12b of the imaging element 12, the image pickup function of the imaging element 12 is given an influence, which deteriorates image quality.

Thus, in the present embodiment, the side surfaces (outer circumference) of the filter 30 are protruded slightly from the filter fixing portion 32 by making the outside dimension of the filter 30 slightly larger than the outside dimension of the filter fixing portion 32. Thereby, if minute particles are separated and fall from the corners of the filter 30, the minute particles fall outside the filter fixing portion 32. That is, the minute particles are prevented from falling onto the imaging element 12 inside the filter fixing portion 32.

It should be noted that causing the side surfaces of the filter 30 to protrude from the filter fixing portion 32 means that the filter 30 is arranged and bonded in a stated where the corners (ends) formed by the side surfaces and the bottom surface (surface to be bonded) are in noncontact with the filter fixing surface 32a or the adhesive 34.

The thickness of the adhesive 34 to fix the filter 30 is, for example, about 30 μm. Additionally, it has been found that minute particles of a size exceeding 5 μm from among minute particles separated from the filter 30 give a bad influence to the imaging element 12.

As shown in FIG. 2, when the adhesive 34 is provided to four corners of the filter, a gap corresponding to the thickness of the adhesive 34 is formed between the filter 30 and the filter fixing portion 32 in a portion in which the adhesive 34 is not provided. Accordingly, it is possible that the minute particles fallen from the filter 30 to outside the filter fixing portion 32 pass through the gap and enter inside the filter fixing portion 32.

Thus, as shown in FIG. 3, a foreign matter pool 36, which a recessed portion surrounded by sidewalls of the through opening 14a, is formed outside the filter fixing portion 32. Minute particles separated and fallen from the filter 30 enter the foreign matter pool 36. The minute particles once entering the foreign matter pool 36 are difficult to move out of the foreign matter pool 36, and if the equipment incorporating the camera module 10 moves during use or transportation, they tend to be prevented from scattering around. Thereby, the minute particles once fallen outside the filter fixing portion 32 are prevented from moving and entering inside the filter fixing portion 32.

It should be noted that although the filter fixing portion 32 is formed as an annular protruding portion and the top surface thereof is made to serve as the filter fixing surface 32a in the present embodiment, there is no need to always set the filter fixing surface 32a at the top surface of the protruding portion. The filter fixing surface 32a can be a flat surface which faces the peripheral portion of the filter 30 and the filter 30 can be fixed via the adhesive 34.

Figure 4:
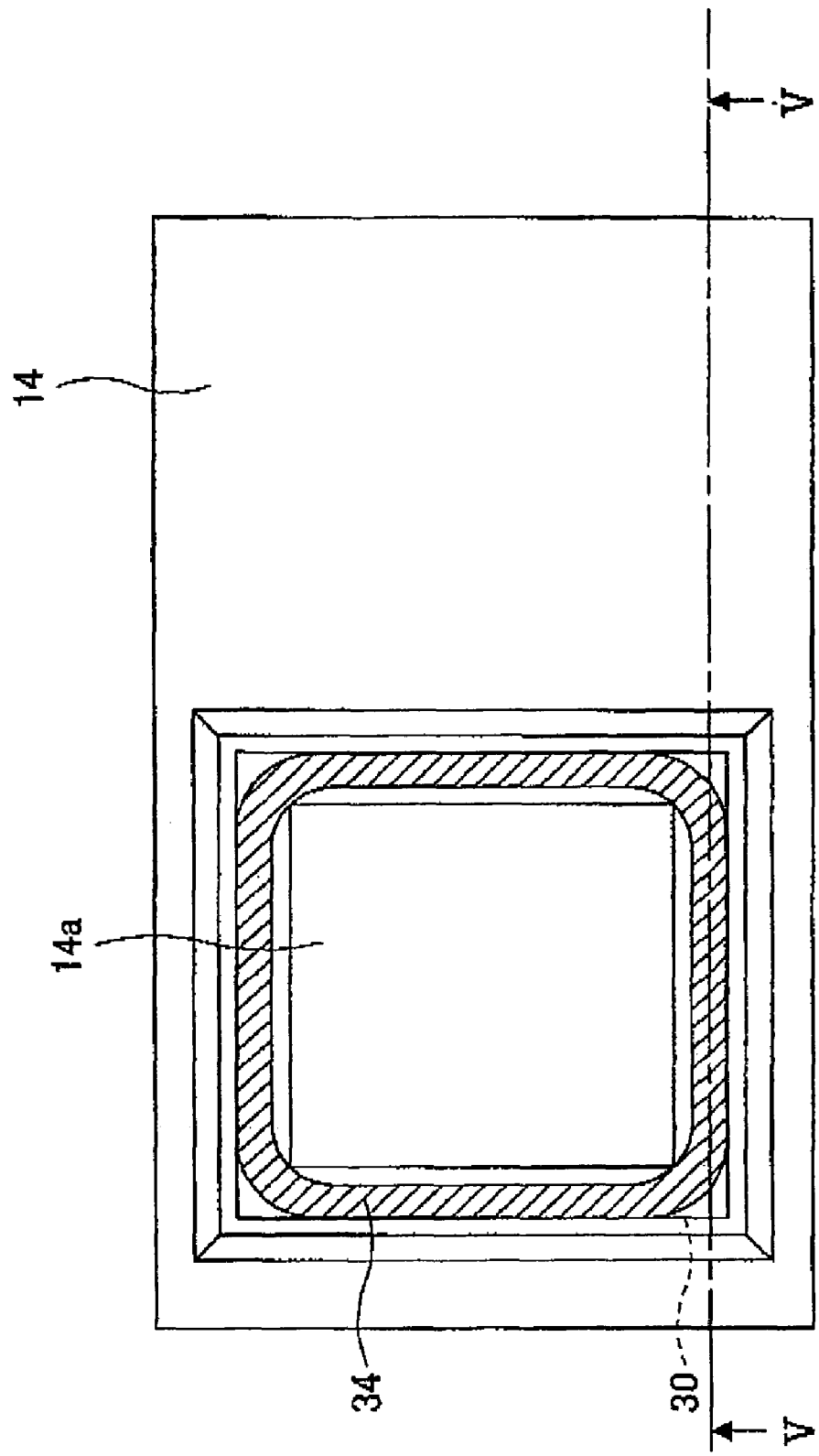
FIG. 4 is a plan view showing a package of the camera module to which a variation of a fixing structure of a filter is applied.
Figure 5:
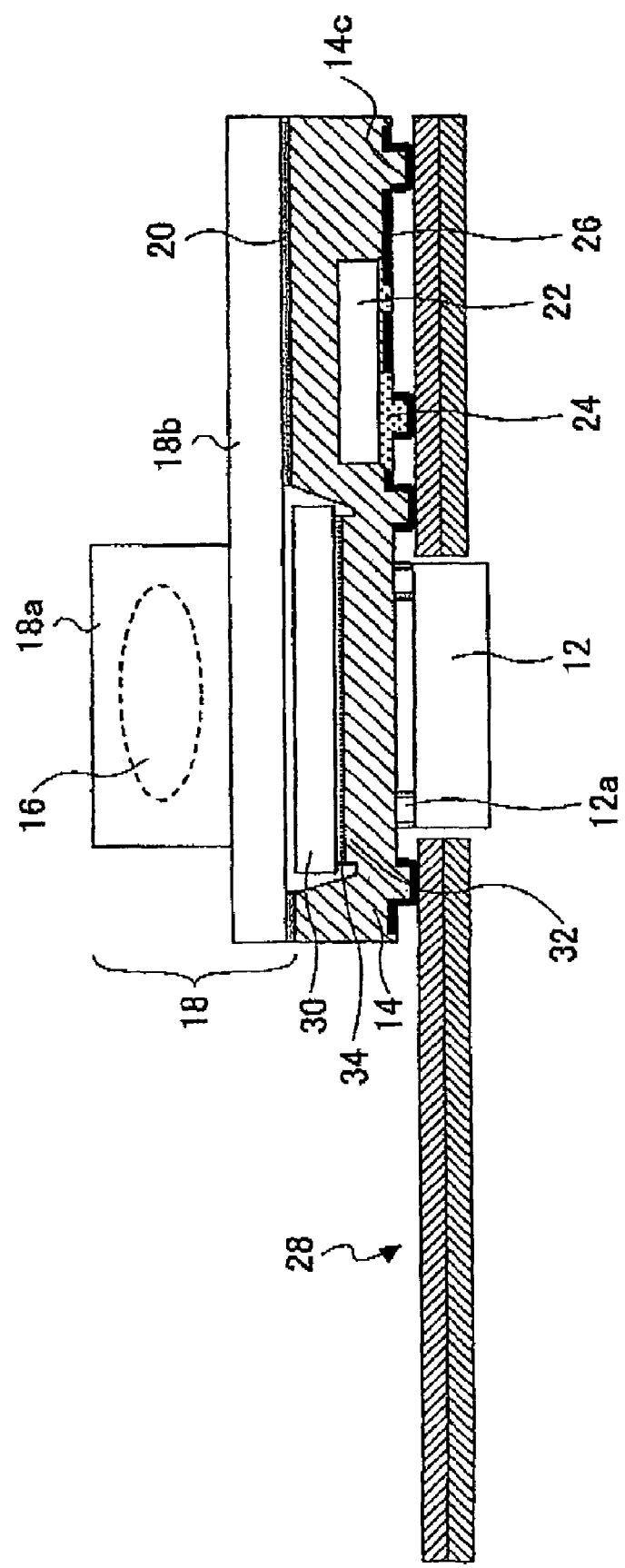
FIG. 5 is a cross-sectional view of the cameral module of which package is cut along a line V-V of FIG. 4.

FIG. 4 is a plan view showing the package of the camera module to which a modification of the filter fixing structure is applied. FIG. 5 is a cross-sectional view of the camera module taken along a line v-V of FIG. 4. In FIG. 4 and FIG. 5, parts that are shown in FIG. 1 through FIG. 3 are given the same reference numerals, and descriptions thereof will be omitted.

The filter fixing portion 32 shown in FIG. 4 and FIG. 5 is formed as an annular protruding portion having an outer configuration of a generally square shape, and four corners thereof are rounded. In FIG. 4, the hatched portion indicates a portion applied with the adhesive 34, and since the adhesive is applied to the entire surface of the filter fixing surface 32a of the filter fixing portion 32, the hatched portion has the surface configuration of the fitter fixing portion 32.

Here, the four corners of the filter 30 are portions that are easily formed and separated as minute particles in the filter 30. Thus, as shown in FIG. 4, it is configured that the four corners that are not rounded greatly protrude outside the filter fixing portion 32 by rounding the four corners of the outer configuration of the filter fixing portion 32. Thereby, minute particles separated from the four corners of the filter 30 positively fall outside the filter fixing portion 32.

Moreover, as shown in FIG. 4 and FIG. 5, since the adhesive 34 is applied over the entire circumference of the filter fixing surface 32a, there is no gap formed between the filter fixing surface 32a and the filter 30, and, thus, minute particles once fallen outside the filter fixing portion 32 are prevented from passing through the gap and entering the filter fixing portion 32.

Next, a description will be given, with reference to FIG. 6 and FIG. 7, of a second embodiment of the present invention.

Figure 6:
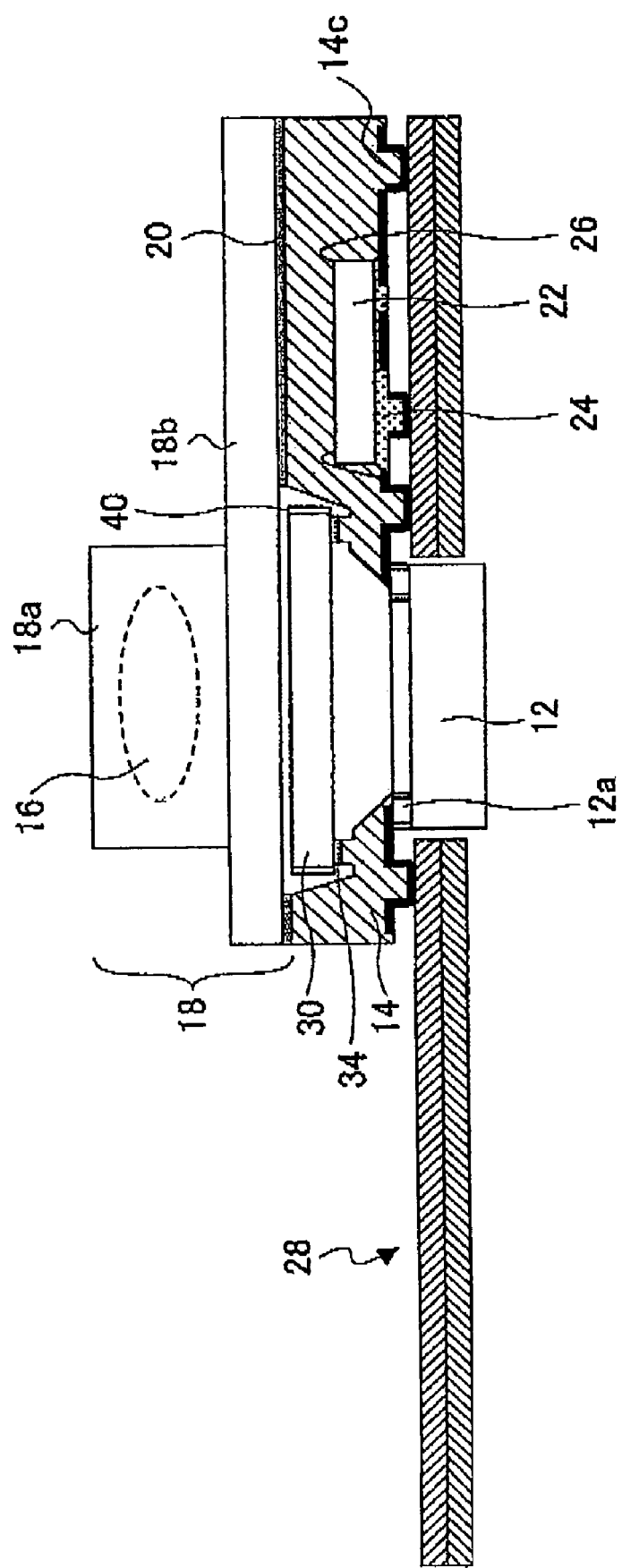
FIG. 6 is a cross-sectional view of a camera module according to a second embodiment of the present invention.
Figure 7:
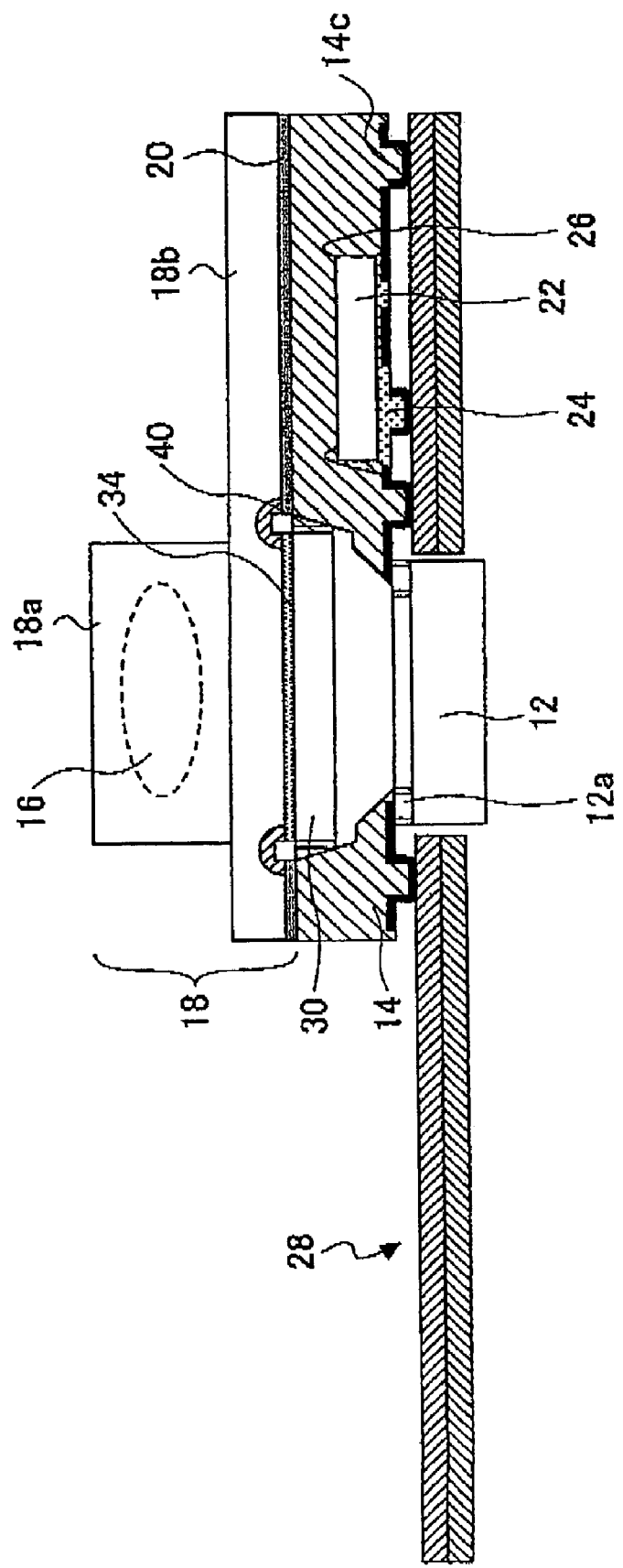
FIG. 7 is a cross-sectional view of a camera module according to a second embodiment of the present invention.

FIG. 6 and FIG. 7 are cross-sectional views of a camera module according to the second embodiment of the present invention. It should be noted that the lens unit 18 is not indicated as a cross section. In FIG. 6 and FIG. 7, parts that are the same as the parts shown in FIG. 1 are given the same reference numerals, and descriptions thereof will be omitted.

In the second embodiment of the present invention, minute particles are prevented from separating from the filter 30 by covering a circumferential portion of the filter 30 by a thin film, a resin, etc. The filter 30 shown in FIG. 6 and FIG. 7 is formed with a thin film on the circumferential portion including the side surfaces before it is incorporated into the camera module.

That is, the filter 30 is subjected to a thin film forming process after it is individualized by being cut out from a large substrate. The portion covered by the thin film is a portion including the side surfaces and portions of the top and bottom surfaces near the side surfaces. Since minute particles attached to the filter 30 are fixed by the thin film, they are prevented from being separated from the filter 30 even if a vibration or shock is applied to the filter 30.

As a material of the thin film, a metal is preferable, and considering an optical influence, palladium, nickel, carbon, aluminum and platinum are particularly preferable. In order to form such a thin film, it is preferable to use vapor deposition or sputtering. A portion of, the filter 30 which is not to be covered by the thin film is masked so as to form a thin film by vapor deposition or sputtering of the above-mentioned materials.

The example shown in FIG. 6 is an example of incorporating the filter 30 previously formed with a metal thin film 40 on the circumferential portion of the filter 30 in a camera module having a structure in which the filter 30 is fixed to the package 14. Since minute particles attached to the circumferential portion of the filter 30 are fixed by the metal thin film 40, the minute particles is prevented from being separated and fallen due to a shock when the filter 30 is incorporated into the package 14. Additionally, the minute particles are prevented from being separated and fallen from the filter 30 also when a vibration or shock is applied during use or transportation of the equipment incorporating the camera module.

The example shown in FIG. 7 is an example of incorporating the filter 30 previously formed with a metal thin film 40 on the circumferential portion of the filter 30 in a camera module having a structure in which the filter 30 is fixed to the lens unit 18. The structure shown in FIG. 7 also provides the same effect as the structure shown in FIG. 7. Additionally, in the structure in which the filter 30 is fixed to the lens unit 18, it is preferable that a recessed portion (groove) is formed around a portion of the lens unit 18 to which the filter is bonded so that the adhesive 34 does not protrudes around. Additionally, it can be configured that the metal thin film 40 formed around the filter does not contact with the bottom surface of the lens unit 18.

Although the metal thin film 40 is formed on the circumferential portion of the filter 30 in the above-mentioned example, a resin may be coated instead of the metal thin film 40.

Figure 8:
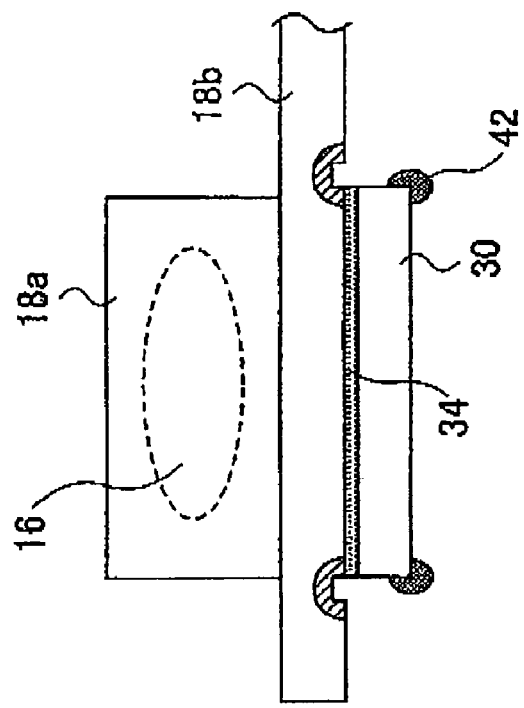
FIG. 8 is a side view of an example of a lens unit into which a filter having a peripheral portion covered by a resin is incorporated.
Figure 9:
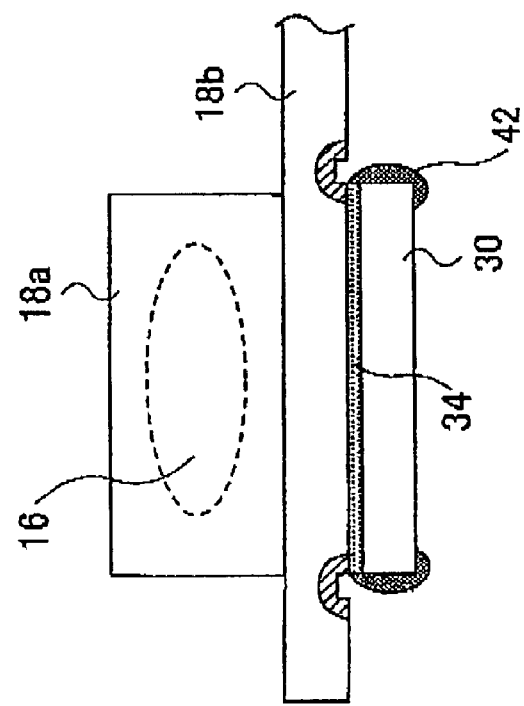
FIG. 9 is a side view of another example of the lens unit into which a filter having a peripheral portion covered by a resin is incorporated.

FIG. 8 and FIG. 9 are the side views of the lens unit into which the filter having a circumferential operation covered by a resin is incorporated.

In the example shown in FIG. 8, the entire circumferential portion of the filter 30 is previously covered by a resin 42, and the filter 30 is fixed to the lens unit by the adhesive 34. The resin 42 is applied so as to cover the side surfaces of the entire circumference (four sides) and the corners formed by the side surfaces and upper and lower surfaces.

In the example shown in FIG. 9, only the four corners of the generally square shaped filter 30 are covered by the resin 42. Since there are many cases in which minute particles are separated from the four corners of the generally square shaped filter 30, there is provided an effect by merely covering the four corners.

Considering an optical influence, the resin 42 is preferably matte and in black or gray. By selecting such a resin, a light reflected by the imaging element 12 is not reflected and scattered by the resin 42, which cases the resin 42 to absorb the reflected light. Thus, deterioration of image quality such as generation of ghost or flare due to a light reflected by the imaging element 12 can be prevented.

Additionally, it is preferable that the resin 42 is a moisture-curing type elastic resin or adhesive. By making the resin 42 as a moisture-curing type, there is no need to heat when curing, and an influence of heat to the filter 30 can be eliminated. Additionally, by using a resin having elasticity and by adjusting an amount of the resin 42 so that the resin 42 is appropriately brought into contact with an inner surface of the through opening 14a of the package 14, an entering path of foreign matters to the imaging element 12 can be shut when incorporating the lens unit 18.

It should be noted that the resin 42 is preferably applied prior to the filter 30 being incorporated into lens unit 18, that is, filter 30 is a single body, so that minute particles do not scatter around by being separated from the filter 30 due to a shock when attaching the filter 30 to the lens unit 18. However, the resin 42 may be applied after the filter 30 is attached to the lens unit.

Moreover, although the filter 30 is fixed to the lens unit 18 in the examples shown in FIG. 8 and FIG. 9, the filter 30 covered by the resin 42 may be fixed to the package 14.

Next, a description will be given of a third embodiment of the present invention.

Figure 10:
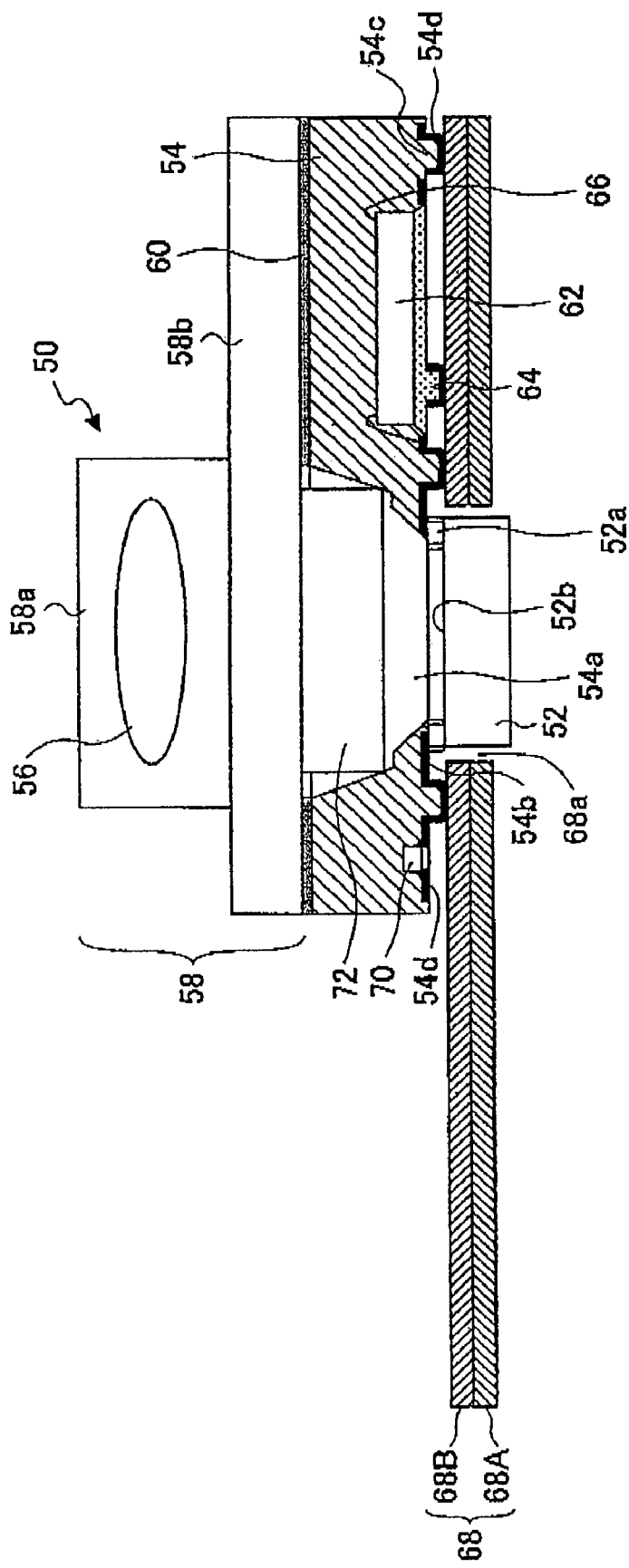
FIG. 10 is a cross-sectional view of a camera module to which a third embodiment of the present invention is applied.

First, a description will be given, with reference to FIG. 10, of a basic structure of a camera module to which the third embodiment of the present invention is applied. FIG. 10 is a cross-sectional view of the cameral module to which the third embodiment of the present invention is applied.

The camera module 50 shown in FIG. 10 comprises a package 54 having an imaging element 52 and a lens unit 58 having an image pickup lens 56 (hereinafter, simply referred to as lens). The package 54 and the lens unit 58 are formed of resin, and the lens unit 58 is fixed to the package 54 via an adhesive 60. It should be noted that the package 54 is cut out in FIG. 10, and a cross-section thereof is shown.

The lens unit 58 comprises a mirror-cylinder part 58a in which the lens 56 is accommodated and a base part 58b which is a portion fixed to the package 54. The mirror-cylinder part 58a is provided with a through opening (not shown) so that a light passed through the lens 56 passes through the through opening and travels toward the package 54. As the lens 56, a plastic lens is used generally.

The package 54 is provided with a through opening 54a as well in a portion opposite to the through hole of the mirror-cylinder part 58a of the lens unit 58. The imaging element 52 is mounted to a bottom surface 54b of the package 54, which is opposite to the lens unit 58, in a state where it covers the through opening 54a. Specifically, protruding electrodes 52a of the imaging element 52 are flip-chip connected to a pattern wiring (terminals) formed on the bottom surface 54b of the package 54.

According to the above-mentioned structure, a light incident on the lens 56 passes the opening of the lens unit 58 and the through opening 54a of the package 54 and is incident on an imaging surface 52b of the imaging element 52 to form an image. An image signal (electric signal) corresponding to the image formed on the imaging surface 52b is output from the imaging element 52.

The image signal output from the imaging element 52 is processed by a processor element 62 incorporated in the plastic package 54. The processor element 62 serves as a processor for controlling an operation of the imaging element 52. A die attachment agent 64 is provided under the processor element 22. The die attachment agent 64 is used for temporarily fixing the processor element. 62 in a process of molding the processor element 62 in the package 54.

Electrodes of the processor element 62 are electrically connected to a plated wiring (pattern wiring) 66 formed on a bottom surface 54b of the package 54 by bonding wires inside the package 54. An output signal from the processor element 62 is supplied to an external device or the line through a flexible board 68 to which the camera module 50 is connected. It should be noted that the flexible board 68 comprises a substrate 68A made of a polyimide film or the like and a pattern wiring 68B formed on the substrate 68A.

It should be noted that chip parts (electronic parts) 70 such as a resistor element, a capacitor, an inductor, etc., are molded into the package 54 in addition to the processor element 62. The chip parts 70 are electrically connected to a pattern wiring 54d made of a metal film formed on the bottom surface 54b of the package 54. Accordingly, the chip parts 70 are electrically connected to the imaging element 52 and the processor element 62 by the pattern wiring 54d.

The flexible board 68 is provided with an opening 68a at a position opposite to the imaging element 52, and the camera module 50 is connected to the flexible board 68 in a state where the imaging element 52 enters the opening 68a. Specifically, protruding electrodes 54c are formed on the bottom surface 54b of the package 54, and the protruding electrodes 54c are connected to a circuit pattern (terminals) of the flexible board 68. The protruding electrode 54c is so-called resin bumps in which a metal film is formed on a protrusion of resin.

In the camera module 50 of the above-mentioned structure, an optical filter 72 (hereinafter, simply referred to as filter) is arranged between the lens 56 and imaging element 52. The filter 72 is provided for adjusting a light incident on the imaging element 52, and the imaging element 52 serves as, for example, a filter for removing an unnecessary infrared component.

The filter 73 is attached to the base part 58b of the lens unit 58, and is arranged in the through opening 54a of the package 54. Although the filter 72 is attached to the lens unit 58 in the example shown in FIG. 10, the filter 72 may be attached in the through opening 54a of the package 54. That is, the filter 72 is attached to the camera modular structure, which comprises the package 54 and the lens unit 58, so as to be arranged between the lens 56 and the imaging element 52.

In the camera module 50 of the above-mentioned structure, a distance between the lens 56 and the imaging element 52 cannot be shorter than a predetermined distance which is determined by a focal distance of the lens 56. Accordingly, it is necessary that the lens unit 58 or the package 54 has a sufficient thickness to acquire the above-mentioned predetermined distance.

However, there is a demand of a further miniaturization and a further reduction in thickness for the camera module, and in a viewpoint of reducing a thickness of the camera module, the space for acquiring the thickness of the lens unit 58 or the package 54 is a wasted space. Although the processor element 62 and the chip parts 70 are molded in the package 54 in the camera module 50, there is a wasted space still existing above the processor element 62 and the chip parts 70.

Thus, in the camera module according to a third embodiment of the present invention, a second semiconductor device and electronic parts are arranged further above the processor element 62 (first semiconductor device) so as to effectively use the above-mentioned wasted space.

Figure 11:
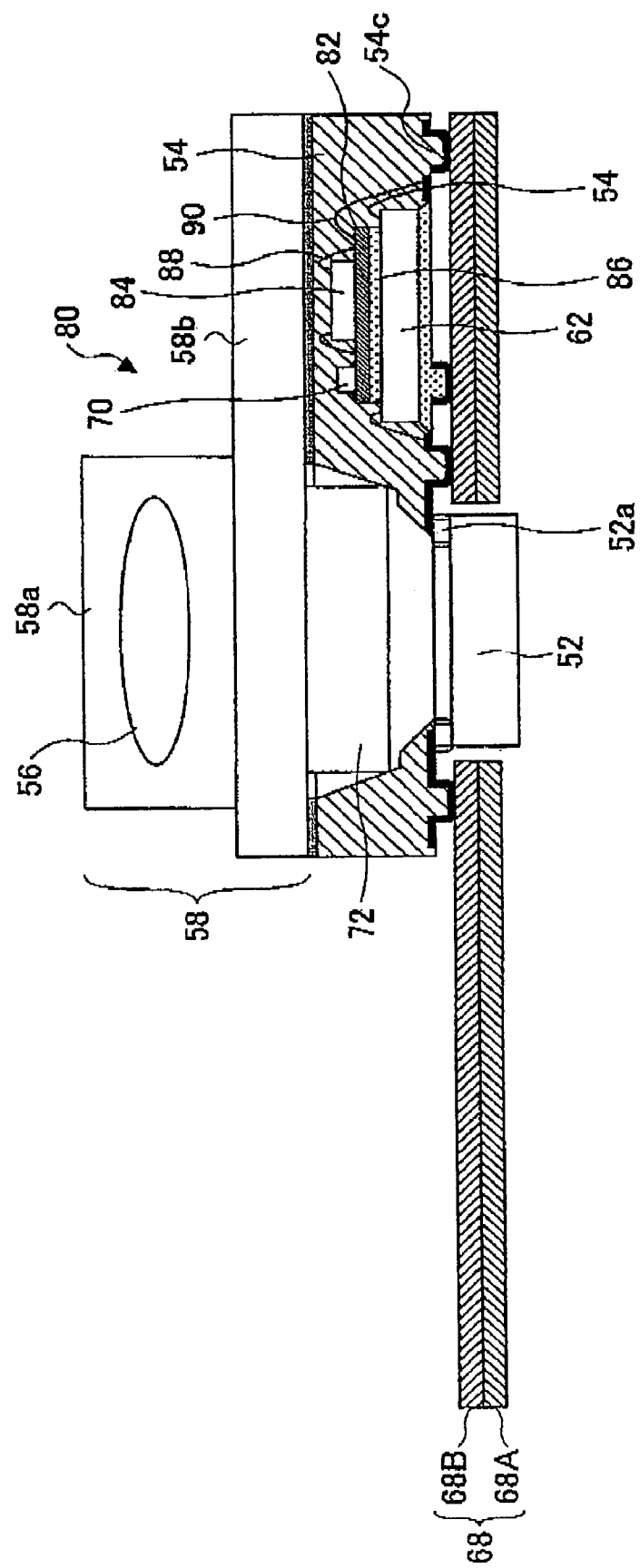
FIG. 11 is a cross-sectional view of a camera module according to a third embodiment of the present invention.

FIG. 11 is a cross-sectional view of a camera module according to the third embodiment of the present invention. It should be noted that the lens unit 58 is shown not by a cross-section but a side view. In FIG. 11, parts that are the same as the parts shown in FIG. 10 are given the same reference numerals, and descriptions thereof will be omitted.

The camera module 80 shown in FIG. 11 has a basic structure the same as the camera module 50 shown in FIG. 10, but differs from the camera module 50 in that a circuit board 82 and a semiconductor memory device 84 (second semiconductor device) are mounted on the processor element (first semiconductor device). Additionally, in the example shown in FIG. 11, the chip parts 70 are mounted on the circuit board 82.

The circuit board 82 is fixed on the circuit formation surface of the processor element 62 by an adhesive 86. Accordingly, the adhesive 86 is preferably an insulating adhesive. However, if an insulating film such as a polyimide film or the like is provided on the circuit formation surface of the processor element 62, an electrically conductive adhesive may be used.

Although the circuit board 82 may a general printed circuit board, it is preferable to be a rigid board such as a glass-epoxy board, a ceramics board or a glass board. For example, when wire-bonding the semiconductor memory device 84 mounted on the circuit board 82 to the circuit board, an ultrasonic energy emitted by an ultrasonic wire bonder is applied to the circuit board 82. If a flexible board having elasticity such as, for example, a polyimide board, is used, the ultrasonic energy may be absorbed by the base material of the circuit board 82. In such a case, bonding cannot be performed well, and it is possible that a bonding defect may be generated. However, by using a rigid board as the circuit board 82, absorption of the ultrasonic wave by the circuit board 82 can be reduced, which prevents generation of the wire-bonding defect.

Moreover, since the flexible board is a material which tends to be deformed, if the flexible board is used as the circuit board 82, a mounting process must be performed while suppressing a deformation (warp) when mounting a semiconductor device or an electronic part on the circuit board 82. However, when the rigid board is used as the circuit board 82, a deformation of the circuit board is small, and, thereby, a yield rate is improved and there is an advantage in a process cost.

Moreover, it is preferable that the circuit board 82 has a metal solid layer of which substantially entire surface is a metal conductive layer. For example, a metal solid layer is formed by applying a copper foil or an aluminum foil, on one side of a base material of the circuit board 82, and a pattern wiring is formed on the surface of the other side. In this case, the metal solid layer side is bonded to the processor element 62 via the adhesive 86. Or, the circuit board 82 may be formed by a multi-layer substrate so as to make one of the layers to be a metal solid layer.

By making the above-mentioned metal solid layer to be at a ground potential, an effect of shielding an electromagnetic field generated by the processor element 62 can be obtained. The processor element 62 is arranged in the vicinity of the imaging element 52 and also electronic parts are located in the vicinity. Thus, when an electromagnetic field is generated from the processor element 62, there may be given a bad influence such as a noise entering the output signal of the imaging element 52. Especially, since an electromagnetic field is easily generated from the circuit formation surface of the processor element 62, a large shielding effect can be obtained by providing the circuit board 82 having a metal solid layer on the circuit formation surface. Thereby, a noise is prevented from entering the output signal of the imaging element 52, which prevents deterioration of images.

In the present embodiment, the semiconductor memory device 84 such as a memory element and the chip parts 70 such as electronic parts are mounted on the above-mentioned circuit board 82. In the camera module, the image signal from the imaging element 52 is processed by the image processing circuit of the processor element 62, and there are many cases where the image signal is stored in a memory. Since a relatively large memory capacity is required for image processing, an exclusive memory is needed. Accordingly, the image data from the processor element 62 can be stored in the semiconductor memory device 84 is the semiconductor memory device 84 is located as an exclusive memory above the processor element 62, which allows the image processing being performed effectively. Additionally, since the distance between the semiconductor memory device 84 and the processor element 62 is short, a processing speed is improved and a possibility of entering noise from a signal wiring or the like is reduced.

Moreover, the chip parts 70 are mounted on the circuit board 82 as mentioned above. Although the chip parts 70 are embedded in the vicinity of the bottom in the package 54 in the example shown in FIG. 10, the chip parts 70 are mounted on the circuit board 82 in the present embodiment. Accordingly, an area occupied by the chip parts 70 within the area of the bottom of the package 54 can be eliminated, which miniaturizes the package 54. Especially, since there are many cases where the cameral module requires many chip parts, the area reduction effect is large.

The above mentioned chip parts 70 are connected to a pattern wiring of the circuit board 82 by a solder, an electrically conductive paste (Ag paste) or the like. Additionally, the semiconductor memory device 84 is connected to the pattern wiring of the circuit board 82 through the bonding wires 88. However, if needed, the semiconductor memory device 84 may be flip-chip mounted to the circuit board. Additionally, the pattern wiring of the circuit board 82 is electrically connected to the pattern wiring 54d formed on the package 54 by bonding wires 90.

Figure 12:
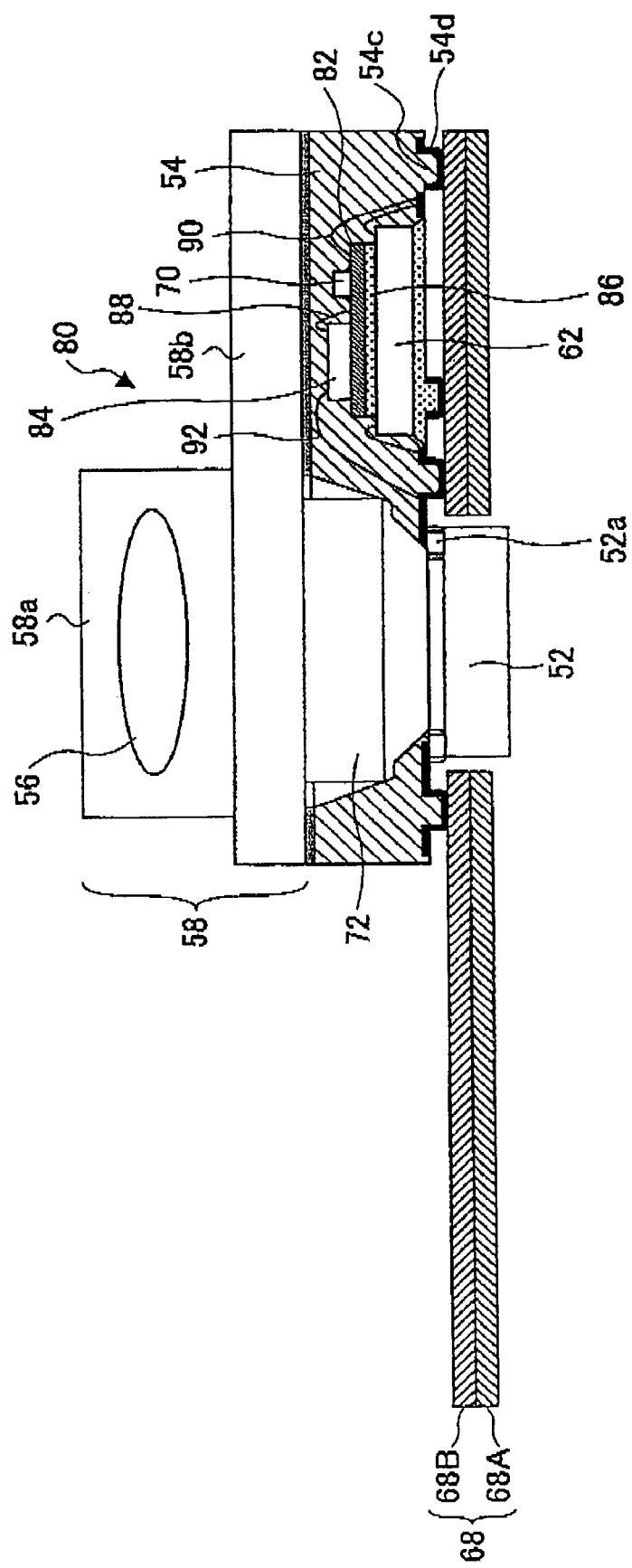
FIG. 12 is a cross-sectional view of a camera module according to a variation of the third embodiment of the present invention.

Here, the semiconductor memory device 84 may be directly connected to the pattern wiring of the package 54 by bonding wires 92 as shown in FIG. 12. Thereby, a path length between the semiconductor memory device 84 and the pattern wiring 54d of the package 54 can be reduced. Additionally, since a number of bonding spots on the circuit board 82 is reduced, there is obtained an effect, for example, that more electronic parts can be mounted on the circuit board 82.

It should be noted that although the semiconductor memory device 84 such as a memory above the processor element 62 in the present invention. It is not limited to the semiconductor memory device, and a semiconductor device such as, for example, a control semiconductor device or the like may be mounted.

Figure 13:
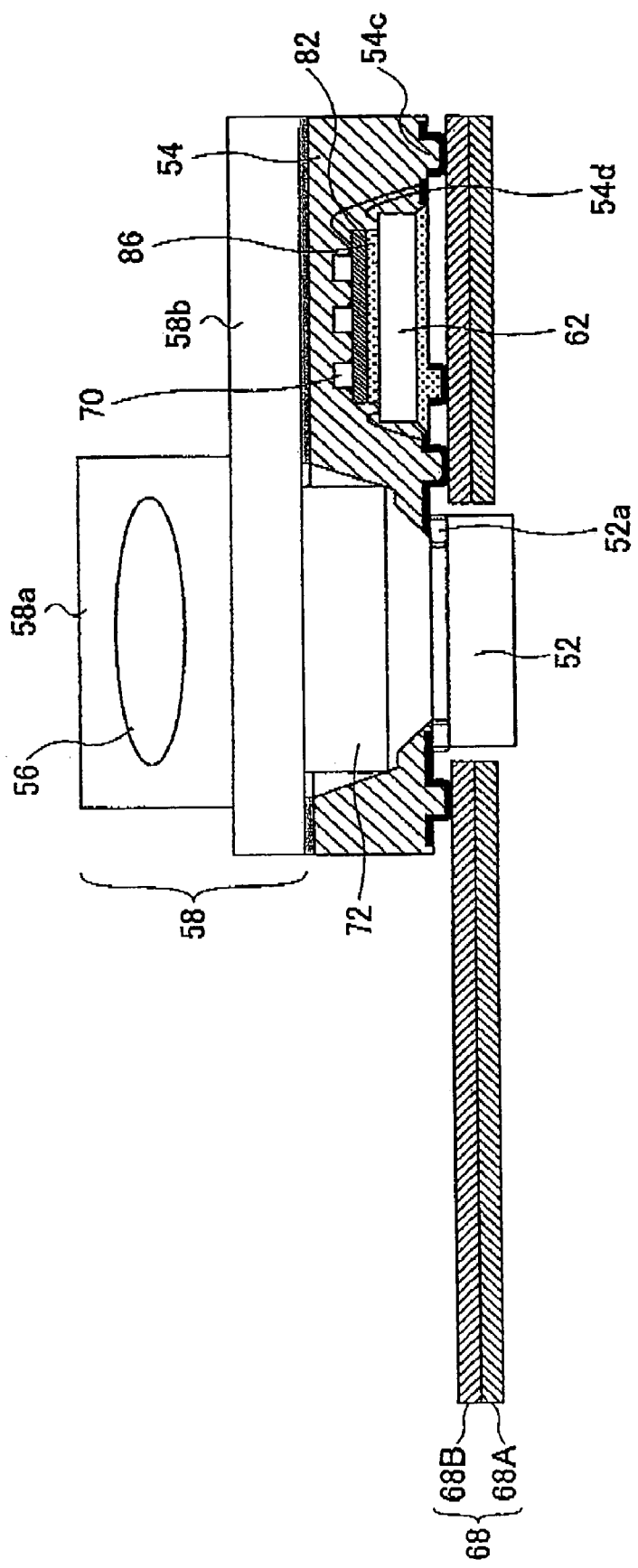
FIG. 13 is a cross-sectional view of a camera module in which only chip component parts are mounted on a circuit board in the structure shown in FIG. 11.
Figure 14:
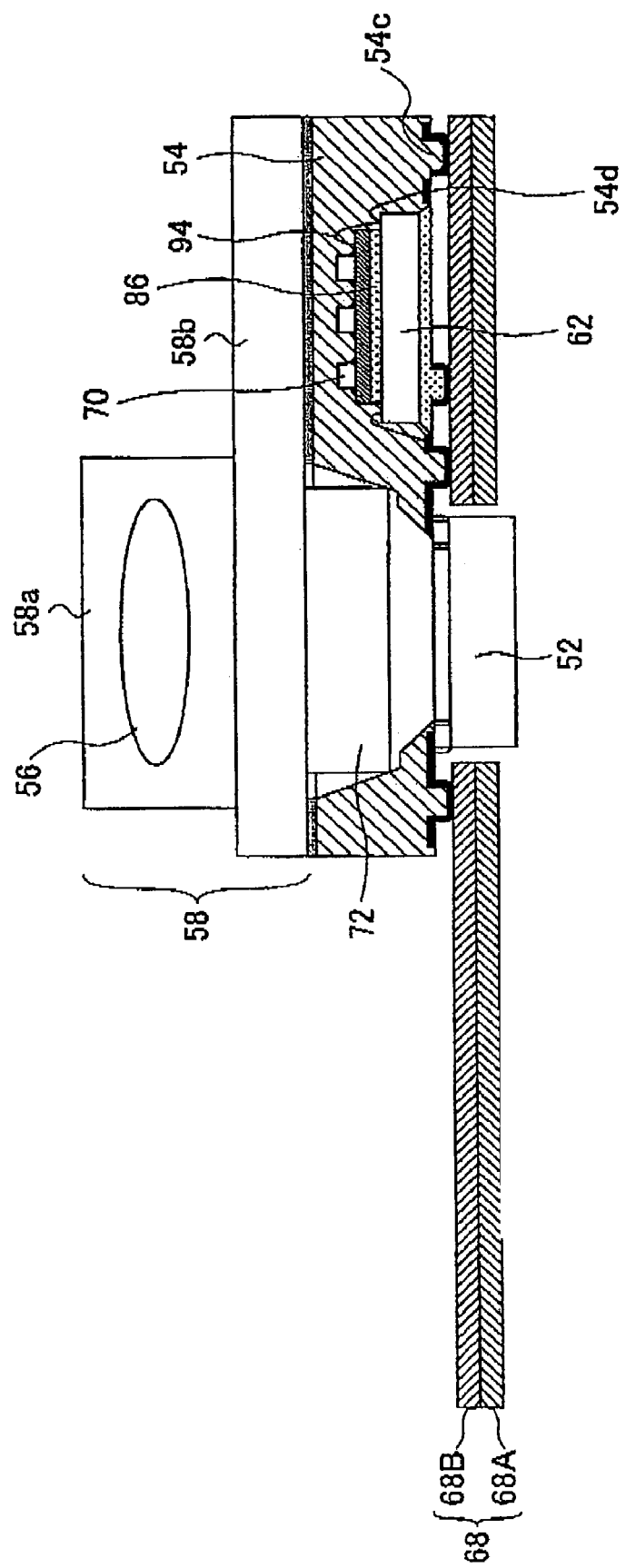
FIG. 14 is a cross-sectional view of the camera module in which only chip component parts are mounted on a circuit board in the structure shown in FIG. 11.
Figure 15:
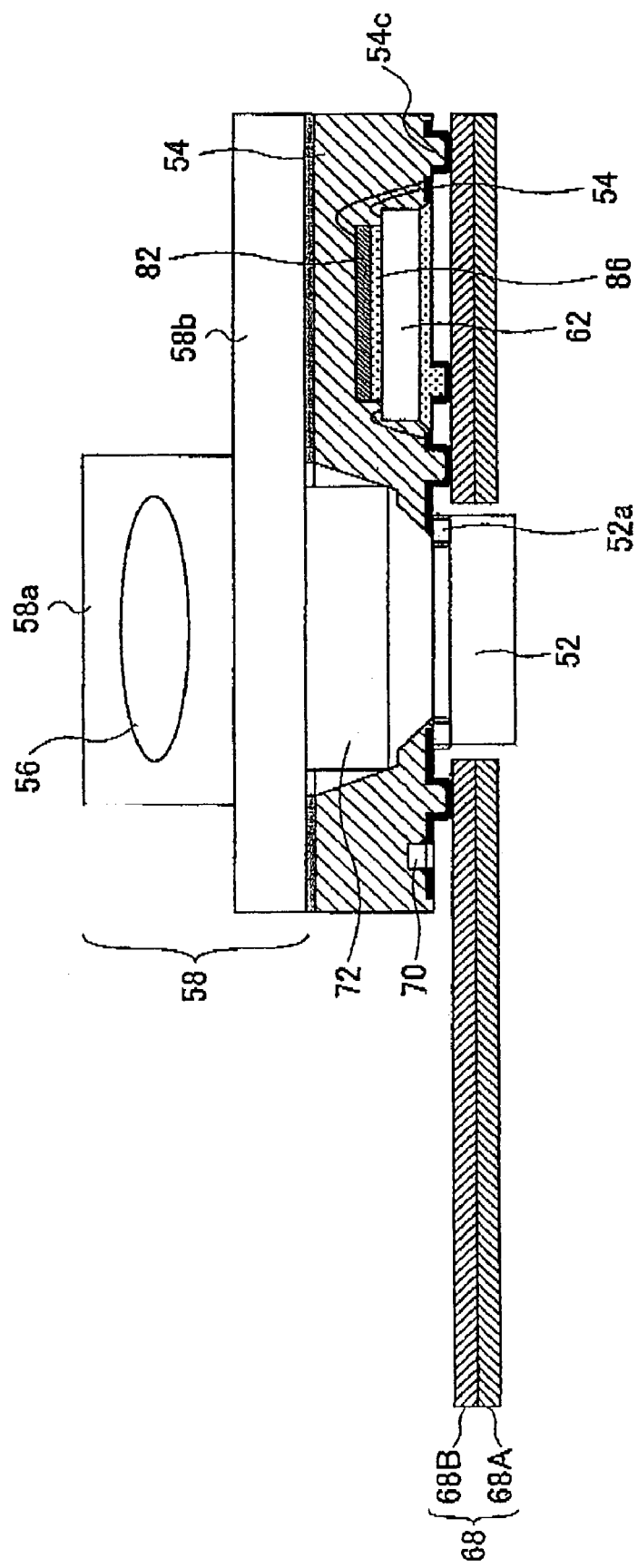
FIG. 15 is a cross-sectional view of the camera module in which only a circuit board is provided on a processor element in the structure shown in FIG. 11.

Moreover, as shown in FIG. 13, only the chip parts 70 may be mounted on the circuit board 82. In this case, more chip parts 70 can be mounted on the circuit board 82. Although the circuit board 82 is connected to the pattern wiring 54d of the package 54 by the bonding wires 90 in the example shown in FIG. 13, it can be connected directly to the processor element 62 by bonding wires 94 as shown in FIG. 14.

Moreover, only an electromagnetic filed shielding effect to the processor element 82 may be obtained by forming the circuit board 82 as a board having a metal solid layer and making the metal solid layer at a ground potential.

The present invention is not limited to the specifically disclosed embodiments, and variations and modifications may be made without departing from the scope of the present invention.

What is claimed is:

1. A camera module comprising:
    a module structure constituted by a lens unit to which an image pickup lens is attached and a package to which an imaging element is attached so as to be opposite to the image pickup lens;
    an optical filter arranged between said imaging element and said image pickup lens; and
    a filter fixing surface provided in said module structure so that a portion of a flat surface of said optical filter is fixed thereto via an adhesive,
    wherein said optical filter is adhered to said filter fixing surface in a state in which an end portion formed by a side surface of said optical filter and said flat surface is in noncontact with both said filter fixing surface and said adhesive, and wherein a recessed portion is formed along the outer circumference of said filter fixing surface so as to surround the outer circumference of said filter fixing surface, and said optical filter protrudes outwardly relative to said filter fixing surface and above said recessed portion.

2. A camera module comprising:
    a module structure constituted by a lens unit to which an image pickup lens is attached and a package to which an imaging element is attached so as to be opposite to the image pickup lens;
    an optical filter arranged between said imaging element and said image pickup lens; and
    a filter fixing portion provided in said module structure so that a portion of a flat surface of said optical filter is fixed to a filter fixing surface of said filter fixing portion via an adhesive, wherein:
    said filter fixing portion is an annular protruding portion formed to protrude from a periphery of said module structure and said filter fixing surface is a top surface of said filter fixing portion; and
    said optical filter is adhered to said filter fixing surface in a state in which a side surface of said optical filter protrudes outside from said annular protruding portion in a direction parallel to said filter fixing surface of said annular protruding portion.

3. The camera module as claimed in claim 2, wherein the outer circumference of said annular protruding portion has a generally square shape having rounded four corners, and said optical filter is adhered by said adhesive being applied to the entire top surface of said annular protruding portion.

\* \* \* \* \*